(12) United States Patent
Heim et al.

(10) Patent No.: US 8,075,194 B2
(45) Date of Patent: Dec. 13, 2011

(54) WHEEL BEARING WITH SENSOR

(75) Inventors: Jens Heim, Bergrheinfeld (DE); Darius Dlugai, Schweinfurt (DE); Peter Niebling, Bad Kissingen (DE); Christian Mock, Schweinfurt (DE)

(73) Assignee: Schaeffler KG, Herzogenaurach (DE)

( * ) Notice: Subject to any disclaimer, the term of this patent is extended or adjusted under 35 U.S.C. 154(b) by 490 days.

(21) Appl. No.: 12/097,026

(22) PCT Filed: Dec. 5, 2006

(86) PCT No.: PCT/DE2006/002154
§ 371 (c)(1),
(2), (4) Date: Jun. 11, 2008

(87) PCT Pub. No.: WO2007/068235
PCT Pub. Date: Jun. 21, 2007

(65) Prior Publication Data
US 2008/0304779 A1 Dec. 11, 2008

(30) Foreign Application Priority Data
Dec. 13, 2005 (DE) .......................... 10 2005 059 393

(51) Int. Cl.
*F16C 19/08* (2006.01)
(52) U.S. Cl. ........................................ 384/448; 384/544
(58) Field of Classification Search .................. 384/448, 384/544, 589; 324/173, 174, 207.25
See application file for complete search history.

(56) References Cited

U.S. PATENT DOCUMENTS

| | | | | |
|---|---|---|---|---|
| 4,940,936 A * | 7/1990 | Grillo et al. | ................... | 324/174 |
| 5,011,302 A | 4/1991 | Mott | | |
| 5,640,087 A * | 6/1997 | Alff | .............................. | 324/173 |
| 5,997,182 A * | 12/1999 | Brown | .......................... | 384/448 |
| 6,232,772 B1 * | 5/2001 | Liatard et al. | ............ | 324/207.25 |
| 7,287,908 B2 * | 10/2007 | Niebling et al. | .............. | 384/448 |
| 2004/0032997 A1 * | 2/2004 | Kasper | .......................... | 384/448 |

FOREIGN PATENT DOCUMENTS

| | | |
|---|---|---|
| DE | 19532328 | 3/1997 |
| DE | 19735978 | 2/1999 |
| DE | 10338959 | 3/2005 |
| JP | 2000249138 | 9/2000 |
| WO | 2005116664 | 12/2005 |

* cited by examiner

*Primary Examiner* — Thomas R Hannon
(74) *Attorney, Agent, or Firm* — Lucas & Mercanti, LLP

(57) ABSTRACT

Wheel bearing (1) has sensor (15) for measuring rotational or angular movements of a wheel with wheel bearing flange (2) and roller bearing (4) attached thereto. Peripheral inner ring (7) has encoder ring (9) serving as transducer. To ensure a reliable operating mode even under the influence of dirt and rust and to be able to attach and detach the wheel bearing (1) with ease, sensor (15) is attached parallel to its radial reading direction (24) on radial contact face (23), pointing to the plane of encoder ring (9), of wheel bearing flange (2). Furthermore, sheet-metal part (16) is fitted on fixed outer ring (6) of roller bearing (4), which sheet-metal part (16) covers at least the reading area of sensor (15) and encoder ring (9) and serves, in circumferential terms, as contact face for sensor (15).

12 Claims, 2 Drawing Sheets

WHEEL BEARING WITH SENSOR

FIELD OF THE INVENTION

The invention relates to a wheel bearing having a sensor for measuring rotational movements or angular movements of a wheel of a motor vehicle, having a wheel bearing flange and a roller bearing which is attached thereto and on whose circumferential inner ring an encoder ring which serves as a measured value transmitter is arranged.

BACKGROUND OF THE INVENTION

Sensors which are used in wheel bearings are required, in particular, to measure the rotational speeds and the rotational behavior of the wheels of a motor vehicle, the vehicle containing a control system which processes this information as input variables for the control system. Such control systems are used, for example, for antilock control, traction control, driving stability control and the like. In this context, it is advantageous to measure direct measured variables. The measured variables include braking acceleration values, drive acceleration values, the rotational speed of the wheels, the angular acceleration and also values of lateral acceleration acting on the vehicle chassis. Because of the transmission of force from the roadway to the vehicle chassis, the wheel bearing is an optimum measuring point for sensing forces and accelerations.

Wheel bearings with sensors are already known in various embodiments. In this context, the sensor is arranged on and attached to the wheel bearing in different ways. In a wheel bearing sensor arrangement as per DE 195 32 328 A1, a sensor body is inserted into a receptacle opening in an attachment clip which is directly connected to the fixed part of the axle body, specifically to the wheel bearing outer ring, and is locked with a clamp.

DE 197 35 978 A1 discloses a wheel bearing in which the sensor is arranged in a depression in the wheel carrier which is open to a pulse transmitter. In this context, the sensor end face bears against a bearing part and is pressed against this bearing part by a spring which is arranged at the bottom of the depression.

Furthermore, DE 103 38 959 A1 discloses an arrangement of a sensor on a wheel bearing unit in which the sensor is attached to an outer wheel bearing ring of the wheel bearing unit and at the same time lies opposite an encoder which is rotationally movable with respect to the sensor, about a rotational axis of the wheel bearing unit. The wheel bearing unit has at least one row of roller bodies and a second row of roller bodies which is adjacent to the first row in the axial direction of the rotational axis, in which case the wheel bearing ring engages around at least one of the rows. The sensor is integrated into a housing and is attached to the outer bearing ring by means of a lever. The lever protrudes axially from the sensor and extends partially radially over the outer bearing ring. A bolt, which is partially pressed in, screwed in or fixed in some other way, holds the sensor against the outer bearing ring by means of the lever. The encoder is concealed with respect to the sensor by means of a covering plate. As a result, the encoder is admittedly protected against soiling and corrosion creep, but the bearing face of the sensor is not.

A disadvantage with these known devices is the relatively complex means of attaching the sensor to the wheel bearing, in particular by providing additional components such as clamps, springs, levers etc.

Furthermore, the uniform distance which is to be maintained between the sensor and the encoder, encoder ring or pulse wheel, that is to say the sensor face and the encoder face to be detected, is an important feature for the operation of the measuring device on the wheel bearing and the associated control system. Corrosion creep on the attachment face of the sensor, in particular in its attachment region, which cannot be ruled out, constitutes a problem which should not be underestimated here. Corrosion creep, caused by moisture, on the attachment face of the sensor can lead to the sensor being pressed away from the encoder in the axial or radial direction as a function of its installation position, with the result that the distance between the sensor face and the encoder face is increased. This frequently leads to signal loss in the sensor, so that a reliable measurement of the rotational speed or rotational angle at the wheel bearing is adversely affected.

OBJECT OF THE INVENTION

The invention is based on the object of providing a wheel bearing having a sensor which permits a reliable method of operation even under the influence of soiling and rust, and at the same time is easy to mount and dismount.

SUMMARY OF THE INVENTION

The means of achieving this object are obtained from the features of the main claim, while advantageous embodiments and developments of the invention can be found in the subclaims.

The invention is therefore based on a wheel bearing having a sensor for measuring rotational movements or angular movements of a wheel of a motor vehicle, having a wheel bearing flange and a roller bearing which is attached thereto and on whose circumferential inner ring an encoder ring which serves as a measured value transmitter is arranged.

In order to achieve the object, the invention provides that parallel to the radial reading direction of the sensor, said sensor is mounted on a radial bearing face, pointing to the plane of the encoder ring, of the wheel bearing flange, and a sheet-metal part which covers at least the reading region of the sensor and the encoder ring is fitted onto the fixed outer ring of the roller bearing and serves as a circumferential bearing face for the sensor.

Since corrosion creep which is caused by moisture during the operation of the wheel bearing can occur on a conventional attachment face of the sensor, the corrosion creep would lead to the sensor being pressed away from the encoder in the radial direction. As a result, the distance between the sensor face and the encoder face could be disadvantageously increased.

According to the invention, the sensor is mounted parallel to its radial reading direction on a radial bearing face, pointing to the plane of the encoder ring, of the wheel bearing flange.

This can preferably be done by means of an attachment element, in particular a screw connection, clip connection or bonded connection. The attachment element in this context prevents a radial movement of the sensor in relation to the encoder due to this actual orientation of the attachment element. As a result, the sensor is fixed in the radial direction in its installation position on the wheel bearing flange. Corrosion creep on the sensor in the region of the bearing face on the wheel bearing flange is therefore prevented. This in turn leads to reliable operation of the wheel bearing in conjunction with the associated control system, since signal losses due to corrosion are prevented. Furthermore, the sensor is easy to mount and dismount.

Furthermore, it may here be particularly preferred for the attachment to be carried out by means of an attachment element which is positioned at a predefinable angle, in particular by means of an attachment element which is positioned at a right angle, to the bearing face.

However, it is also possible here to select an angle for the attachment element which differs from a right angle, as a result of which protection against rotation can also be provided.

Furthermore, the reliable method of operation of the sensor is also assisted according to the invention by virtue of the fact that a sheet-metal part which covers at least the reading region of the sensor and the encoder ring and which serves as a circumferential bearing face for the sensor is fitted onto the fixed outer ring of the roller bearing. Owing to the attachment element for the sensor being positioned at a right angle to the bearing face, said sensor is prevented from twisting out of its normal installation position compared to the attachment axis of the attachment element if there is corrosion creep, since the sensor face bears against the sheet-metal part which covers the encoder ring.

The encoder ring has alternatively signal-receiving, signal-reflecting or signal-generating areas which are arranged uniformly distributed over the circumference. The encoder ring is therefore provided with a face which can be sensed.

According to a further embodiment of the invention, the sensor is screwed to the radial bearing face of the wheel bearing flange, at a right angle or at an angle which differs from a right angle. This prevents the sensor from twisting about the axis of the screw connection. In this context, the sensor is preferably attached to the bearing face from the rear of the wheel bearing flange with a screw. A screw connection between the sensor and the wheel bearing flange forms a secure connection which is easy to implement and which also permits easy mounting and dismounting of the sensor on the wheel bearing. Of course, a different method of attaching the sensor, for example by means of a bolt, may also be implemented.

In a further embodiment of the wheel bearing, the sensor has, on the circumference of the sensor face, at least two webs which are spaced apart from one another and which bear against the radial outer circumferential face of the sheet-metal part which is fitted onto the outer ring of the roller bearing. The webs prevent the sensor from twisting or tilting about its attachment axis with respect to the encoder face, in particular if there is corrosion creep on the sensor bearing face.

As an alternative to the above or in addition to the above, the sensor can also have, in the reading region, a contour which corresponds to the circumferential contour of the sheet-metal part which is fitted onto the outer ring of the roller bearing. This measure also prevents twisting or tilting of the sensor about its attachment axis, since the contours of the sensor reading face and of the sheet-metal part are congruent.

In order to prevent rusting of the sheet-metal part which is fitted onto the outer ring of the roller bearing, the sheet-metal part is composed of a rust-resistant material.

BRIEF DESCRIPTION OF THE DRAWINGS

The invention will be explained in more detail below with reference to the appended drawing and using an exemplary embodiment. In said drawing.

DETAILED DESCRIPTION OF THE DRAWINGS

Figure 1:
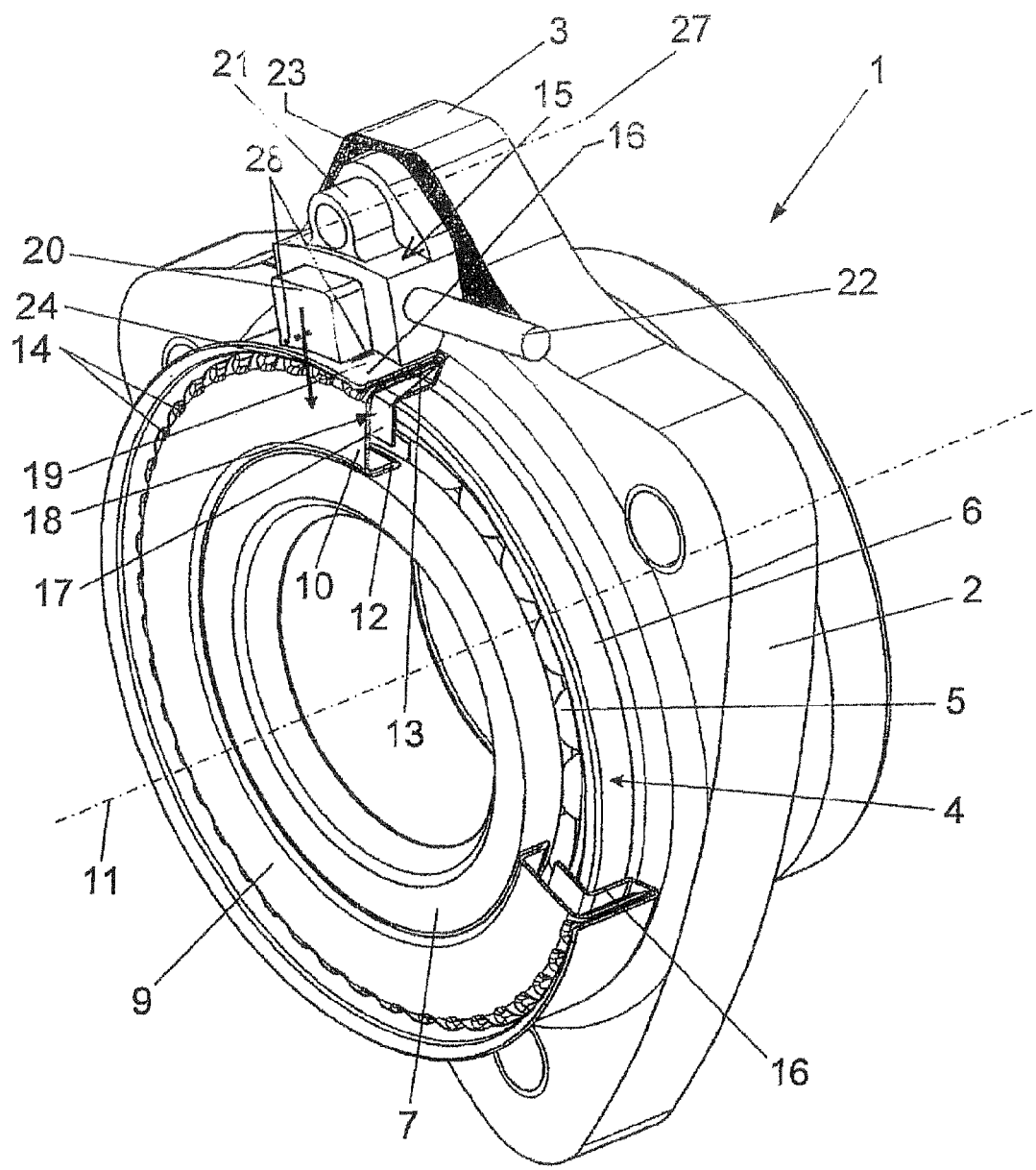
FIG. 1 is a perspective front view of a wheel bearing according to the invention.

The wheel bearing 1 (shown in FIGS. 1 and 2) of a wheel (not illustrated) of a motor vehicle has a wheel bearing flange 2 which has an essentially triangular shape with rounded corners. One of the sides of the wheel bearing flange 2 is provided with a raised portion 3. The wheel bearing 1 comprises a roller bearing 4 which can have single-row, two-row or four-row sets of roller bearings, but also all other possible sets of wheel bearings with rollers or balls as roller bearings 5. The roller bearing 4 has a fixed outer ring 6 and an axially extended and rotatable inner ring 7, between which the roller bearings 5 are mounted in a roller bearing cage 8.

Plugged onto the rotating inner ring 7 of the roller bearing 5 is an encoder ring 9 which has an approximate U-shape in cross section, in which case the bottom 10 of the U-shape runs radially with respect to the wheel bearing axis 11, the shorter limb 12 of the U-shape projects coaxially between the inner ring 7 and the outer ring 6, and the longer limb 13 of the U-shape projects coaxially and toward the outside of the outer ring 6.

The encoder ring 9 which rotates with the inner ring 7 has a plurality of alternatively signal-receiving, signal-reflecting or signal-generating areas 14 which are arranged uniformly distributed over the circumference and can be detected by a sensor 15. The encoder ring 9 can be composed of an alternately polarized magnetized material, such as polyamide plastic, or of magnetized or ferromagnetic metal, or of a combination of these materials.

A sheet-metal part 16 which is composed of a rust-resistant material and which serves as a circumferential bearing face for the sensor 15 is plugged onto the fixed outer ring 6 of the roller bearing 4. The sheet-metal part 16 has, in cross section, a limb 17 which at first extends outward in a radial direction with respect to the wheel bearing axis 11 and then extends to the wheel bearing flange 2 at a right angle in a coaxial direction with respect to the wheel bearing axis 11 about the circumferential face of the outer ring 6. In the further profile, the sheet-metal part 16 turns by 180° in a coaxial direction with respect to the wheel bearing axis 11, thereby forming a gap 18, and the remaining limb 19 runs away from the wheel bearing flange 2 in a coaxial direction with respect to the wheel bearing axis 11, in which context the axial terminating edge of the limb 19 is approximately flush with the bottom plane of the encoder ring 9. The limb 13 of the encoder ring 9 therefore projects axially into the gap 18 which is formed by the sheet-metal part 16.

The sensor 15 serves to measure rotational movement or angular movement of a wheel of the motor vehicle and is essentially composed of a sensor head 20 and of a sensor housing 21 from which a sensor cable 22 leads to a control system (not illustrated) of the motor vehicle. The sensor 15 is attached to a planar bearing face 23 of the raised portion 3 of the wheel bearing flange 2, which is illustrated by dark shading in FIG. 1 and which extends radially with respect to the wheel bearing axis 11 and lies in the plane of the front face of the wheel bearing flange 2.

Figure 2:
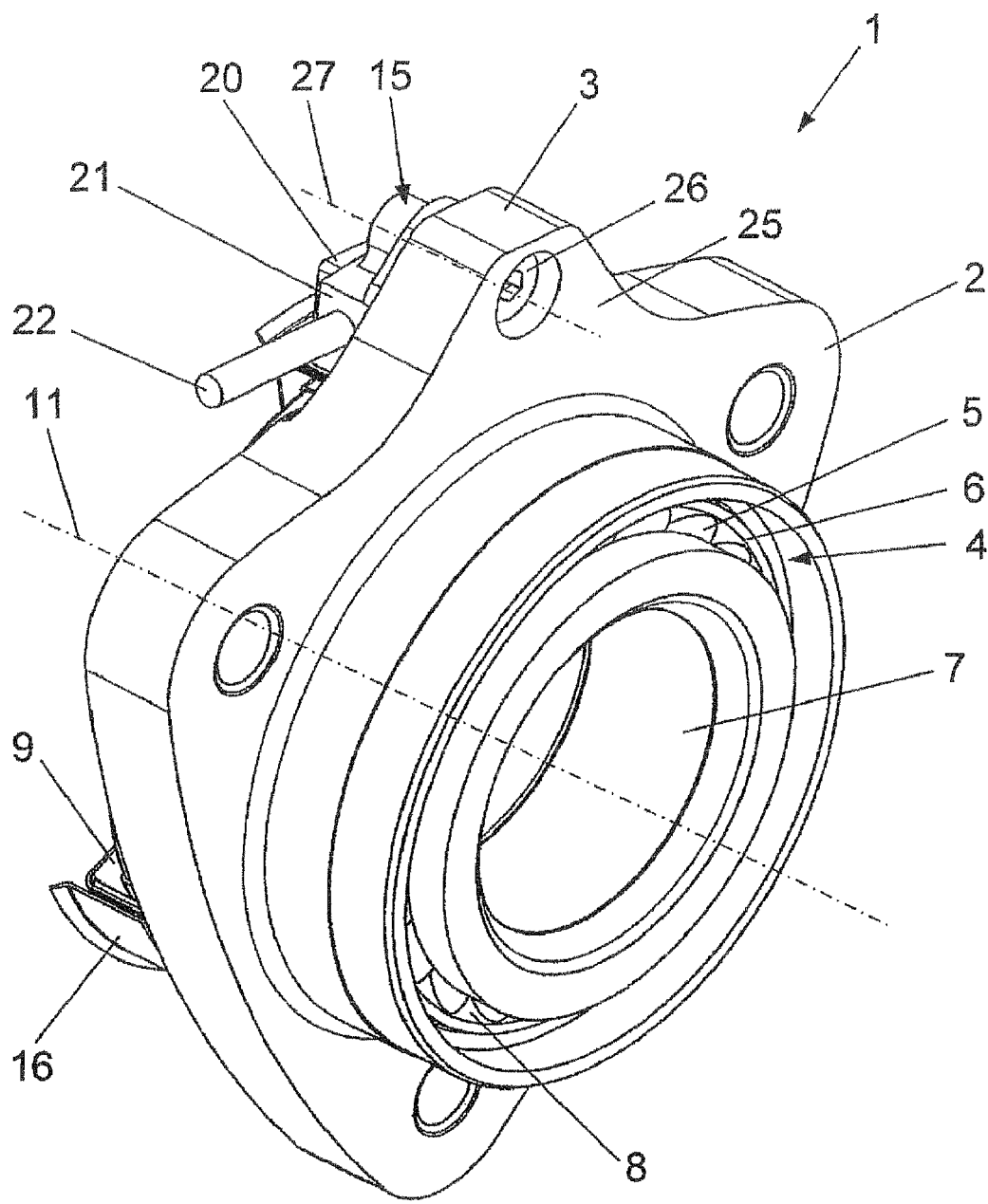
FIG. 2 is a perspective rear view of the wheel bearing shown in FIG. 1.

The sensor head 20, whose reading direction is indicated by the arrow 24 in FIG. 1, is therefore oriented in such a way that its sensor face bears against the outer circumferential face of the limb 19 of the sheet-metal part 16. As a result, the sensor face is congruent with respect to the areas 14 of the encoder ring 9 which are arranged uniformly distributed over the circumference, and it can detect said areas 14. The signals or measured data are transmitted via the sensor cable 22 to the control system of the motor vehicle. The sensor face of the sensor 15 has, in the reading region, a contour which corresponds to the contour of the limb 19 of the sheet-metal part 16 which is fitted onto the outer ring 6 of the roller bearing 5.

The sensor 15 is attached to the bearing face 23 of the raised portion 3 from the rear 25 of the wheel bearing flange 2 with a screw 26 which serves as an attachment element, with the result that the attachment axis 27 of the screw 26 extends parallel to the wheel bearing axis 11.

Furthermore, the sensor face of the sensor head 20 is provided on the circumference with at least two webs 28 which are spaced apart from one another and which bear against the radial outer circumferential face of the sheet-metal part 16 which is fitted onto the outer ring 6 of the roller bearing 5, specifically the limb 19 of said sheet-metal part 16.

REFERENCE NUMERALS

1 Wheel bearing
2 Wheel bearing flange
3 Raised portion
4 Roller bearing
5 Roller body
6 Outer ring
7 Inner ring
8 Roller bearing cage
9 Encoder ring
10 Bottom
11 Wheel bearing axis
12 Limb
13 Limb
14 Areas
15 Sensor
16 Sheet-metal part
17 Limb
18 Gap
19 Limb
20 Sensor head
21 Sensor housing
22 Sensor cable
23 Bearing face
24 Reading direction
25 Rear
26 Screw
27 Attachment axis
28 Webs

The invention claimed is:

1. A wheel bearing, comprising:
an inner ring;
an outer ring;
roller bodies between the inner ring and outer ring;
a wheel bearing flange extending radially outward from the outer ring, the wheel bearing flange having a front bearing face and a rear bearing face spaced axially apart from each other by multiple sides with only one of the sides having a single uniformly solid raised portion which extends radially outwardly from the outer ring farther than other sides;
a sensor having a sensor cable and a reading region for measuring rotational movements or angular movements of a wheel of a motor vehicle about a radial reading direction, the sensor and the sensor cable are both mounted on the raised portion of the front bearing face of the flange at an axial end of the wheel bearing, the reading region of the sensor facing radially inward;
an encoder ring, which is arranged on the inner ring and at the axial end of the wheel bearing, serving as a measured value transmitter, the sensor and the encoder ring being adapted to carry out rotational detection on the axial end of the wheel bearing; and
a sheet-metal part, which covers at least the reading region of the sensor and the encoder ring, being fitted onto the outer ring of the roller bearing and serving as the circumferential bearing face for the sensor.

2. The wheel bearing as claimed in claim 1, wherein the sensor is mounted on the front bearing face by an attachment element.

3. The wheel bearing as claimed in claim 1, wherein the sensor is mounted on the front bearing face by an attachment element which is positioned at a predefineable angle to the front bearing face.

4. The wheel bearing as claimed in claim 3, wherein the predefineable angle is a right angle.

5. The wheel bearing as claimed in claim 1, wherein the sensor is attached to the front bearing face from the rear bearing face of the wheel bearing flange by a screw.

6. The wheel bearing as claimed in claim 1, wherein the sensor has, against a circumference of a sensor face, at least two webs which are spaced apart from one another and which bear against the circumferential bearing face of the sheet-metal part.

7. The wheel bearing as claimed in claim 1, wherein the sensor has, in the reading region, a contour which essentially corresponds to a contour of the sheet-metal part.

8. The wheel bearing as claimed in claim 1, wherein the sheet-metal part is composed of a rust-resistant material.

9. The wheel bearing as claimed in claim 1, wherein the encoder ring has alternatively signal-receiving, signal-reflecting or signal-generating areas which are arranged uniformly distributed over a circumference of the encoder ring.

10. The wheel bearing as claimed in claim 1, wherein the sensor is screwed to the front bearing face by an attachment element.

11. The wheel bearing as claimed in claim 1, wherein the sensor is screwed by a screw connection on the front bearing face by an attachment element, which is positioned at a predefined angle to the front bearing face.

12. The wheel bearing as claimed in claim 11, wherein the predefineable angle is a right angle.

* * * * *